United States Patent [19]

Scholl et al.

[11] 4,273,568

[45] Jun. 16, 1981

[54] PRESS AND BLOW GLASS FORMING

[75] Inventors: John J. Scholl, Elmira; Warren D. Staley, Painted Post, both of N.Y.

[73] Assignee: Corning Glass Works, Corning, N.Y.

[21] Appl. No.: 120,353

[22] Filed: Feb. 11, 1980

[51] Int. Cl.$^3$ ............................................. C03B 9/193
[52] U.S. Cl. ......................................... 65/76; 65/79; 65/82
[58] Field of Search ....................... 65/76, 79, 82, 229

[56] References Cited

U.S. PATENT DOCUMENTS 1,785,535  12/1930  Sloan ........................................ 65/79
2,263,126  11/1941  Gray et al. .......................... 65/266 X

FOREIGN PATENT DOCUMENTS 1263308  2/1972  United Kingdom ........................ 65/82

OTHER PUBLICATIONS

Tooley, Handbook of Glass Manufacture, vol. I, Ogden Publishing Company, New York, N.Y., 1953, pp. 326-339.

*Primary Examiner*—Richard V. Fisher
*Attorney, Agent, or Firm*—Burton R. Turner

[57] ABSTRACT

A method is disclosed for pressing and blowing a hollow article wherein a soft blank having a cavity is press formed which may require only minimal surface reheating prior to the blowing of such blank into a finished hollow article. At the completion of the press forming, the core temperature of the soft blank is substantially equal to the delivery temperature of the charge from which the soft blank is formed.

12 Claims, 7 Drawing Figures

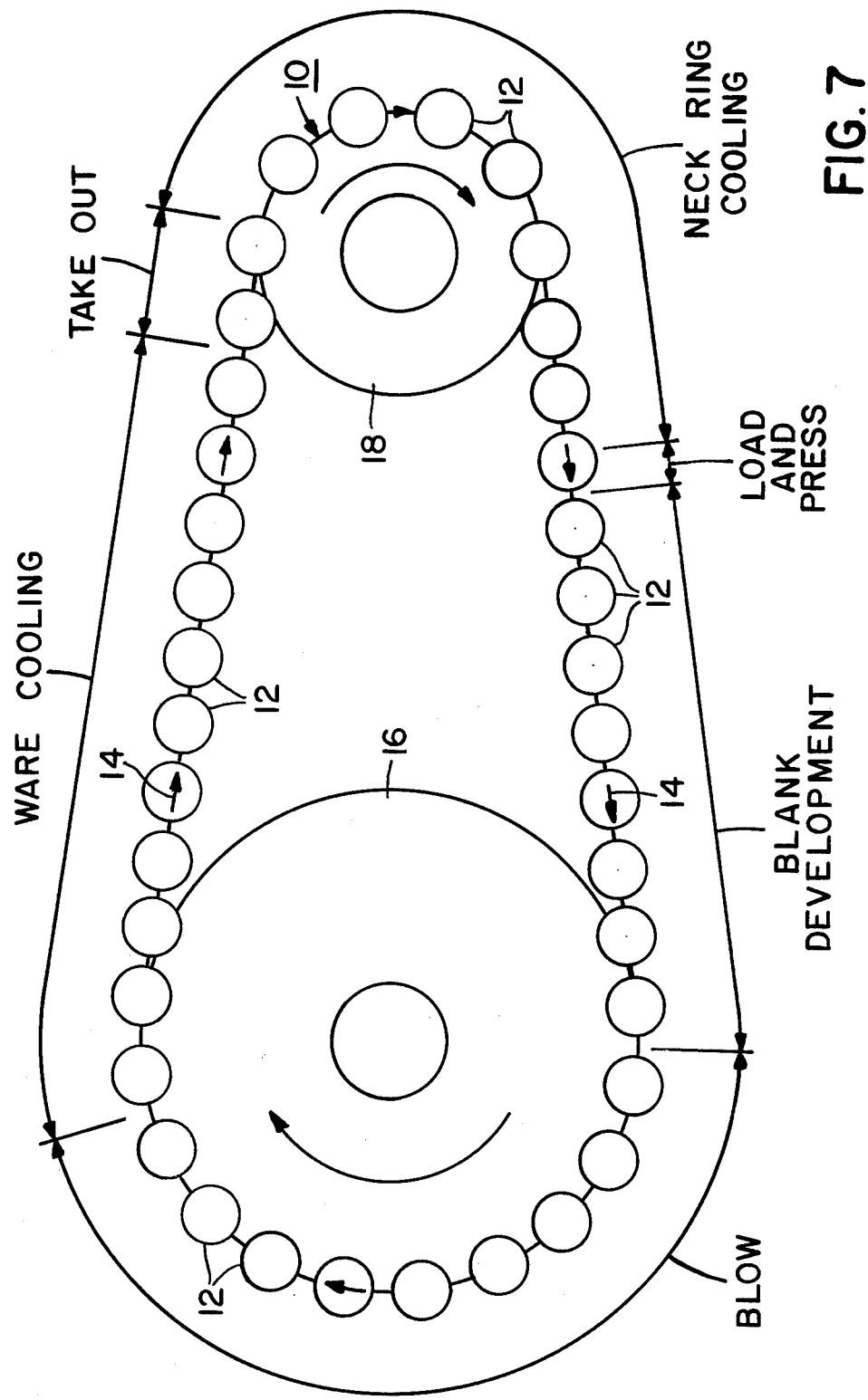

PRESS AND BLOW GLASS FORMING

BACKGROUND OF THE INVENTION

This invention relates to the art of forming glass articles from molten glass, and more particularly to a process of press forming a plurality of virtually identical soft parisons or blanks with a predetermined cavity press formed therein and extending downwardly below a blank supporting surface, which performed soft blank is subsequently blown into a final hollow glass article.

In the past it has been known to form parisons for press and blow operations by conventional means such as the Hartford I.S. machine, the Miller press and blow machine and the Lynch MB machine. The Hartford I.S. machine utilizes a plurality of blank molds, each with its own plunger, blowhead and neck ring. With the mold, plunger and neck ring in position, a charge is received in the mold and blown down so that the plunger forms the finish in the neck ring. After a counter blow the parison is completely formed and the blank mold opened with the glass parison held by the neck ring which is then rotated 180° in a vertical plane to a position over a closing blow mold, wherein the neck ring is opened to release the parison into the blow mold and is then rotated back into position with the mold and plunger for a repeat cycle. From the time that the gob initially enters the blank mold until the time that the blank mold is opened, the molten glass may be in contact with the mold for in excess of 8 seconds, which materially reduces the temperature of the blank or parison thus forming a hard parison and requiring reheating of the blank surface from heat retained within the core of the blank in order to blow the parison into a finished article.

Both the Miller press and blow machine and the Lynch MB machine utilize rotating tables having a plurality of molds thereon for forming the blank or parison, wherein the tables are rotated with an intermittent or cyclic movement such that the molds stop at each station. Whereas the Miller press and blow machine uses one plunger for forming the blank and transfers the same by use of a neck ring, the Lynch MB machine utilizes individual plungers for each mold and transfers the parison from a blank mold table to a blow mold table by means of a swing transfer mechanism. Here again, however, the initial blank or parison is in contact with the blanking mold for an extended period of time in excess of 5 seconds for the Miller machine and greater than 8 seconds for the Lynch MB machine, again producing a hard blank which must have its exterior surfaces reheated from heat retained in the inside of the blank in order to accomplish the final blow. A more complete explanation of the operation of the Hartford I.S. machine, the Miller press and blow machine and the Lynch MB machine is set forth on pages 326-339 of Handbook of Glass Manufacture, Vol. 1 by Fay V. Tooley. However, from the foregoing it can be seen that the devices of the prior art include extended gob residence time in the blank mold resulting in excessive heat removal from the parison and the formation of a hard blank, which requires a large amount of surface reheating from heat retained in the core or inside of the blank in order to finally blow the parison into a finalized article.

U.S. Pat. No. 2,263,126 discloses a glass working apparatus wherein a gob of glass is intercepted during free fall by a pair of parison forming cups and deposited as a formed charge over the orifice of an orifice plate. Although the glass to metal residence time utilized during such forming may be similar to that encountered in the present invention when press forming the parison with a preshaped cavity, the actual shaping of an article from such formed charge does not materialize until after the formed charge is deposited upon an orifice plate, requiring additional residence time.

Thus, whereas the presently known press and blow processes generally form a preshaped charge of glass in a blank mold resulting in a hard blank which must be reheated before entry into the final blow mold where the parison is converted into a finished article, the present invention sets forth a method of pressing a soft blank having an initial preformed cavity, which blank passes through an elongation and development phase and then is blown into the final article.

It thus has been an object of the present invention to improve upon the known technology of delivering and forming molten glass into parisons while minimizing the amount of heat withdrawn therefrom so as to provide a soft blank which reheats well above the softness point prior to being formed into an article with relatively thin walls.

SUMMARY OF THE INVENTION

In its very simplest form, the present invention relates to a method of forming hollow glass articles by press forming a preshaped soft blank having an initial cavity and subsequently blowing such soft blank into a finished article. The soft blank is preferably ring pressed with a minimum of glass to metal residence contact time so that the core temperature of the blank at the completion of the press forming is substantially equal to the temperature of the gob charge delivered to the parison mold. The process lends itself particularly to the press forming of soft blanks from hard glasses.

BRIEF DESCRIPTION OF THE DRAWINGS

FIG. 1 illustrates the gob loading of a parison mold.

FIG. 2 illustrates the ring pressing of a soft blank within the parison mold showing the formation of an initial cavity within the blank supported by a neck ring.

FIG. 3 illustrates the initial puffing of the neck ring supported soft blank.

FIG. 4 illustrates the elongation of the blank under the influence of gravity and the possible application of cutting air.

FIG. 5 illustrates the blowing of the elongated blank into an article within a split wall mold.

FIG. 6 illustrates a finished blown article.

FIG. 7 is a schematic plan view of a continuous path apparatus for carrying out the invention and indicating the various steps along the path of travel.

DESCRIPTION OF THE PREFERRED EMBODIMENTS

Figure 1:
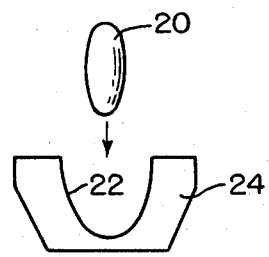
FIGS. 1 through 6 schematically illustrate the forming process of the present invention utilized to press and blow a hollow glass article.

Referring now particularly to FIGS. 1 through 6, the process of forming blown hollow ware is initiated by delivering a charge or gob of molten glass 20 into the cavity 22 of a parison mold 24. A plunger 26 having a ring 28 passes through an orifice 11 of a neck ring 12 to press form a soft blank 30 within the cavity 22 of blank or parison mold 24. The soft blank 30 is also pressed into the orifice 11 of neck ring 12 and accordingly is supported by the neck ring, and has a cavity 32 formed by the plunger 26 extending downwardly from the support neck ring 12. The parison mold 24 and plunger 26 are quickly removed from the newly formed soft blank 30, which is then freely suspended from said neck ring, so as to minimize glass to metal contact time, or blanking time as it is known, and to thereby minimize the amount of heat withdrawn from the gob and thus form a shaped soft blank having a cavity therein. Although a variety of mold and plunger mechanisms may be utilized to press the soft blank so long as glass residence time is held to a minimum, a preferred embodiment is shown in our commonly owned copending U.S. patent application Ser. No. 120,352, filed on even date entitled "Method and Apparatus for Forming Glass Parisons". Further, a preferred embodiment of neck rings which may be utilized with the present invention is set forth in commonly owned U.S. patent application entitled "Neck Ring Mechanism", Ser. No. 120,330, filed on even date.

A soft blank is defined as being a ring pressed blank having a cavity formed therein wherein at the completion of the press forming, the core temperature of the glass forming the blank is substantially equal to the temperature of the glass charge delivered to the blanking mold. Preferably less than about 10% of the thickness of the soft blank between the mold and the plunger, at the completion of the press forming, is below the softening point temperature of the glass being formed, thus leaving about 90% or more of the glass thickness at an easily formable temperature above the softening point of the glass.

The formation of a soft blank is virtually essential in forming thin walled lightweight blown articles, unless additional reheating is accomplished to reheat the surface of a conventional hard blank. That is, the formation of a soft blank is a blanking time-glass temperature or blanking time-glass viscosity relationship, wherein the blanking time is held to a minimum thus producing a shaped charge of molten glass with a thin shallow depth temperature gradient on the glass surface while the interior remains essentially at the gob delivery temperature. Since only that portion of the soft blank which is above the softening point temperature of the glass can readily be further deformed into a finished article without necessitating reheating, it is imperative to maintain the surface layer which is below such softening point temperature to a minimum in order to be able to produce thin walled blown ware. The time-temperature relationship involved is supported by empirical data which indicates that a one second difference in blanking time relates to about a 4% difference in final thickness of the ware, and thus the maximum glass to metal residence time or blanking time of the present invention is preferably maintained at a fraction of a second.

Figure 3:
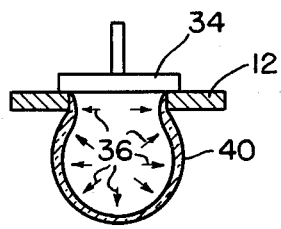
Figure 4:
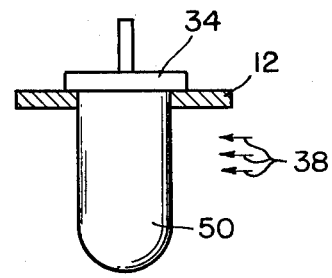

Referring now to FIG. 3, a blowhead 34 is shown engaging neck ring 12 so as to provide an initially puffed parison 40 through the use of puffing air represented by arrows 36. As shown in FIG. 4, the initially puffed parison retained within orifice 11 and supported by neck ring 12 is allowed to elongate under the influence of gravity into an elongated parison 50. The size and shape of the glass blank or parison are controlled by external cooling or cutting air represented by arrows 38 and also by preprogrammed puffs of air through the blowhead 34. The elongated parison 50 is then positioned within a split blow mold 52 and blowing air represented by arrows 54 is applied through blowhead 34 to blow the parison into a finished hollow blown article 60. Finally, the article is allowed to cool and removed from split blow mold 52 and neck ring support 12 as a lightweight thin walled finished blown article 60. Such article may have relatively thin walls of only about 0.05" thick, whereas conventional press and blow articles may have a wall thickness of about 0.15" thick, or a factor of 3.

Referring now to the schematic illustration of FIG. 7, an apparatus 10 is shown having a plurality of neck rings 12 connected together in a chain link-like manner which move along a continuous predetermined path shown by arrows 14. The continuous path includes a portion of the circumference of a blow mold table and drive sprocket wheel 16 and a sprocket wheel 18, rotated in the direction shown by the arrows. The various method steps schematically illustrated in FIGS. 1 through 6, as sequentially indicated in FIG. 7 together with the relative time interval required for each step. That is, assuming that the plurality of neck rings 12 move along the continuous predetermined path at a constant speed as driven by sprocket wheels 16 and 18, the distance over which each step is performed represents the relative time required for such step.

Figure 2:
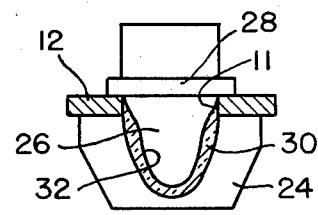
Figure 5:
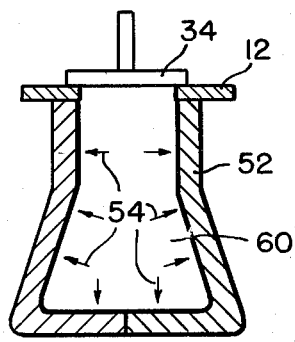
Figure 6:
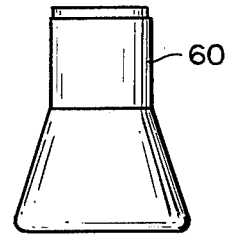

The steps of loading the gob into the parison mold and pressing the soft blank as shown in FIGS. 1 and 2, are performed in the interval designated "LOAD AND PRESS", whereas the initial puffing and elongation of the parison as shown in FIGS. 3 and 4 are performed during the interval designated "BLANK DEVELOPMENT". The blowing out of the parison into a finished article as shown in FIG. 5 is performed in that interval designated "BLOW" as the neck rings 12 pass about an arcuate portion of the circumference of blow mold table 16. The ware is then cooled during that portion of the path designated "WARE COOLING" and the article 60 as shown in FIG. 6 is removed from the neck ring during that interval designated "TAKEOUT". The neck rings are then cooled in that section designated "NECK RING COOLING" as they continue through the continuous predetermined path back to the "LOAD AND PRESS" position.

As can be seen from FIG. 7, a relatively small time interval is required to load and press the soft parison when compared with the overall time involved with blank development, blowing the final article, ware cooling and takeout. The relatively short time interval from the loading of the gob into the parison mold until the end of contact between the glass and the parison mold and plunger, results in the production of a preformed soft blank, as only a minimum amount of heat is removed from the glass. Since the glass to metal contact time or blanking time has been held to a minimum during the press forming of the soft blank into the desired shape and thickness, only relatively shallow surface depths are reduced in temperature relative to the interior or core temperature of the soft glass parison, which interior remains essentially at the gob delivery temperature.

If the process were run at a commercially acceptable speed of about 100 pieces per minute, the total residence time of glass to metal contact would be about 0.3 seconds whereas if the process were run at half such speed, the total residence time of glass to metal contact would still be only 0.6 seconds. Thus, the fraction of a second glass to metal contact or residence time required to form the soft blank of the present invention is many orders of magnitude shorter than the 2 to 8 second residence times of the known processes. Accordingly, the amount of heat removed from the press formed soft blank of the present invention is on the order of magnitudes less than that removed with the known processes which result in the formation of conventional hard blanks which must be reheated in order to blow the final article.

The fact that the present invention produces a formed soft blank by minimizing glass residence time in the parison mold and thereby minimizing the amount of heat withdrawn from the delivered glass charge, makes the invention particularly applicable to the formation of lightweight thin walled blown ware from hard glasses. The ASTM definition of "hard glass" states "(1) A glass of exceptionally high viscosity at elevated temperatures. (2) A glass of high softening point. (3) Commonly refers to a glass difficult to melt . . ." As used in the industry, the term "soft glass" refers to glasses which are easy to melt and have relatively low softening points, such as soda lime glasses having softening points in the range of about 700–725° C. Hard glasses, on the other hand, are more difficult to melt and have relatively higher softening points such as borosilicate glasses wherein Corning Code 7740 borosilicate glass has a softening point of about 820° C.

Generally, a softer glass, that is one which melts at a relatively lower temperature, will have a relatively long working range, whereas a harder glass such as Corning 7740 borosilicate glass which has a rather high softening point, will have a relatively short working range. "Working range" is defined by ASTM as "The range of surface temperature in which glass is formed into ware in a specific process . . .". Since the lower end of the working range is generally considered to be about the softening point of the glass, it is imperative to form a soft blank in order to minimize the amount of heat which must be withdrawn from the core glass to reheat the surface glass of a parison, for further forming, particularly when utilizing hard glasses. The soft blank has a core substantially equal to the delivery temperature of the charge and a minimal surface depth with a temperature below the softening point temperature of the glass forming such parison, with such surface depth preferably being less than about 10% of the thickness of the parison, and thus the core of the soft blank retains sufficient heat to readily reheat the surface to a temperature above the softening point temperature of the glass. Thus, the viscosity of the soft parison is sufficiently low so that it may be blown into a final lightweight thin walled blown article.

Although the now preferred embodiments of the invention have been disclosed, various changes and modifications may be made thereto without departing from the spirit and scope thereof as defined in the appended claims.

We claim:

1. A method of forming a thin walled lightweight hollow glass article which comprises, delivering a charge of molten glass to a parison mold, rapidly press forming said charge to form a soft blank having a cavity formed therein, minimizing the amount of heat extracted from said molten charge during said press forming so that at the completion of said press forming the core temperature of the soft blank is substantially equal to the delivery temperature of said charge, controllably developing said soft blank, and blowing said developed blank into a finished lightweight hollow glass article having relatively thin walls.

2. A method of forming a hollow glass article as defined in claim 1 including the step of supporting said soft blank immediately after formation and said developing blank solely about a neck area, and freely suspending said blanks from said neck area support.

3. A method of forming a hollow glass article as defined in claim 1 wherein the press forming step includes ring pressing said charge of molten glass into supporting engagement with a neck ring.

4. A method of forming a hollow glass article as defined in claim 1 or 2 including the step of controllably developing said soft blank by periodically puffing said blank and permitting said blank to elongate under the influence of gravity.

5. A method of forming a hollow glass article as defined in claim 1 including the step of maintaining at least about 90% of the cross section of said soft blank at a temperature above the softening point temperature of the glass charge upon the completion of the press forming of said soft blank.

6. A method of forming a hollow glass article as defined in claim 1 including the step of loading and press forming said charge within a maximum time period of a fraction of a second.

7. A method of pressing and blowing a parison to form a hollow glass article wherein the necessity for reheating the pressed parison surface prior to blowing is minimized which comprises, delivering a charge of molten glass into a cavity of a parison mold, relatively positioning a neck ring about the cavity adjacent said mold, rapidly press forming said charge of molten glass into a soft parison having a cavity formed therein, minimizing glass to metal contact time during the loading and pressing of said soft parison to reduce the amount of heat extracted from said charge of molten glass, maintaining the core temperature of said soft parison at the completion of said press forming substantially equal to the delivery temperature of said molten charge, suspending said soft parison from said neck ring, elongating said parison, and blowing said elongated parison into a finished hollow glass article.

8. A method of pressing and blowing a parison to form a hollow glass article as defined in claim 7 including the step of periodically puffing said parison as it is allowed to elongate under the influence of gravity.

9. A method of pressing and blowing a parison to form a hollow glass article as defined in claim 7 including the step of inhibiting the extraction of heat from said molten glass charge during said press forming and permitting less than about 10% of the cross section of said soft parison at the completion of said press forming to be at a temperature less than the softening point temperature of the glass charge.

10. A method of pressing and blowing a parison to form a hollow glass article as defined in claim 7 including the step of maintaining the glass charge in contact with said parison mold and a pressing plunger during the loading and pressing thereof for a maximum period of a fraction of a second.

11. A method of pressing and blowing a parison to form a hollow glass article as defined in claim 7 wherein the press forming step includes ring pressing said charge of molten glass into a soft parison suspendably engaging said neck ring.

12. A method of pressing and blowing a parison to form a hollow glass article as defined in claim 7 including the step of delivering a charge of molten hard glass to said parison mold.

* * * * *